United States Patent

[11] 3,563,334

[72] Inventor Ed R. McCarter
 Houston, Tex.
[21] Appl. No. 742,387
[22] Filed July 3, 1968
[45] Patented Feb. 16, 1971
[73] Assignee Esso Production Research Company
 a corporation of Delaware

[54] SEISMIC SOURCE FOR USE WHILE SUBMERGED IN A LIQUID MEDIUM
 9 Claims, 7 Drawing Figs.
[52] U.S. Cl. .................................................. 181/0.5
[51] Int. Cl. .................................................. G01v 1/04
[50] Field of Search ............................................ 181/0.5(IC)

[56] References Cited
 UNITED STATES PATENTS
 2,994,397 8/1961 Huckabay .................... 181/0.5
 3,380,551 4/1968 Lang ............................ 181/0.5
 3,480,101 11/1969 Barry et al. .................. 181/0.5

Primary Examiner—Rodney D. Bennett, Jr.
Assistant Examiner—Daniel C. Kaufman
Attorneys—James A. Reilly, John B. Davidson, Lewis H. Eatherton and James E. Reed ABSTRACT: Seismic source for use in an aqueous medium utilizes an elastomer member supported by and disposed on at least a portion of a supporting structure. The supporting structure preferably includes a number of tubular members connected at the trailing end to a bell-shaped member and at a towing end to a pair of bell-shaped members positioned to discharge liquid from the medium into the tubular members. An explosively combustible fluid is introduced into the chamber formed by the elastomer member and the support structure through a mixing chamber and an elongated pipe that extends into the chamber. The explosive fluid is ignited in the mixing chamber. Pump means is provided for removing liquid from the interior of the chamber.

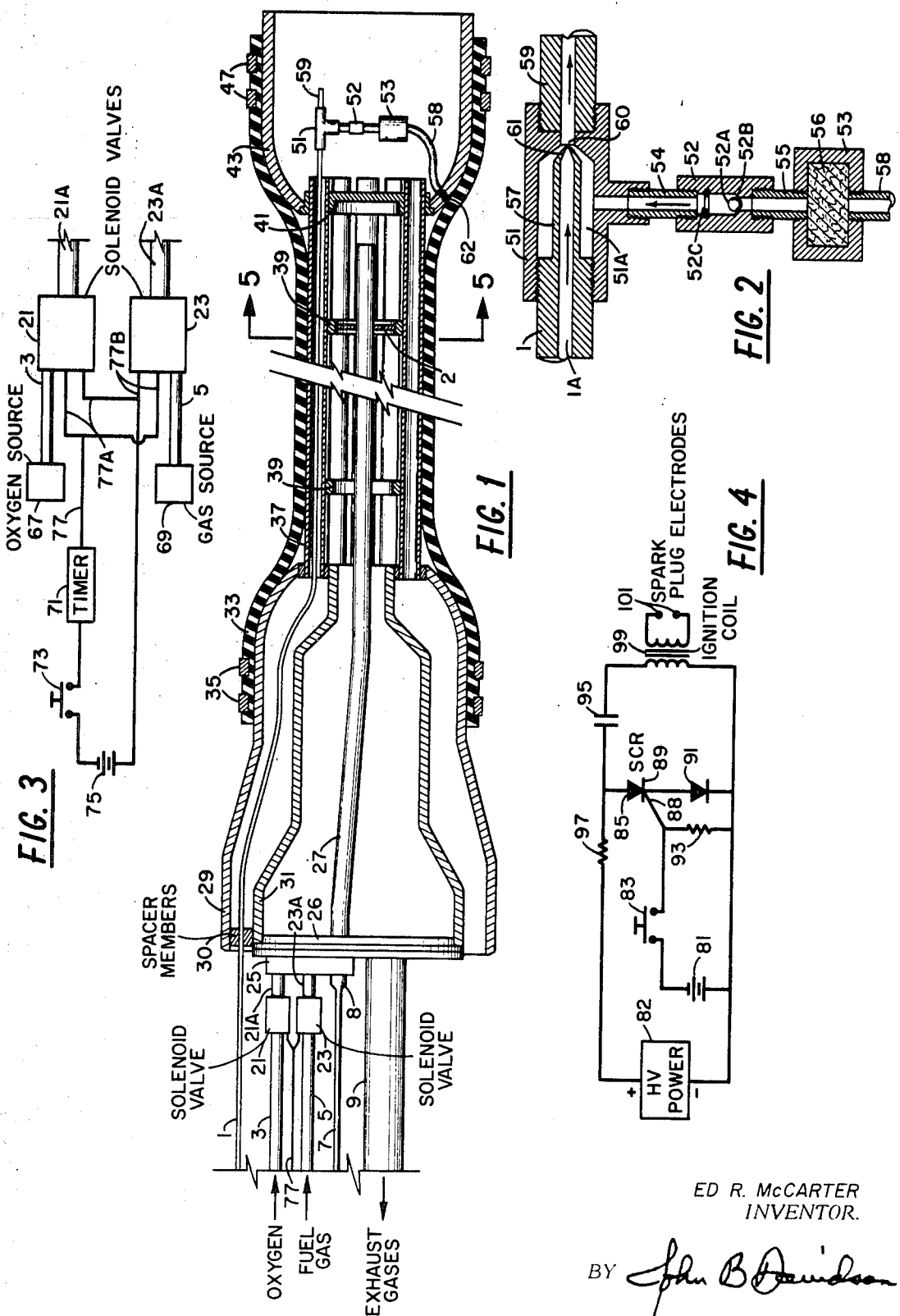

Patented Feb. 16, 1971

ED R. McCARTER
INVENTOR.

BY John B Davidson

ATTORNEY

SEISMIC SOURCE FOR USE WHILE SUBMERGED IN A LIQUID MEDIUM

BACKGROUND OF THE INVENTION

This invention is directed to seismic sources for use at marine locations and more particularly to seismic sources using an explosive gaseous mixture in an enclosure that includes a flexible, expansible elastomer.

Various types of nondynamite seismic wave sources have been developed in recent years for use at marine locations. One of the most successful of these sources uses a supporting structure to which is affixed an expansible elastomer member to form a combustion chamber for explosive gases. Means are provided connected to the supporting structure for introducing an explosive fluid into the combustion chamber, and for igniting the fluid. Also provided is means for exhausting spent gases from the enclosure after production of the seismic pulse. Preferably the supporting structure includes a plurality of tubular members, and bell-shaped members at each end of the tubular members for holding the tubular members in predetermined spatial relationship, such that a coolant (preferably the liquid within which the apparatus is submerged) may flow therethrough to cool the supporting structure and the gases within the enclosure formed by the supporting structure and the elastomer member. This seismic wave source has met with wide commercial acceptance and is used at many locations throughout the world in routine seismic exploration operations.

While the apparatus described immediately above has been outstandingly successful as a seismic source, in operation it has been found to suffer from certain shortcomings. For example, water has been found to build up within the expansible enclosure which can interfere with detonation of the explosive fluid therewithin. Furthermore, as compared to dynamite it is not an exceptionally strong source so that any improvement in the strength of the seismic waves produced thereby can be quite advantageous.

SUMMARY OF THE INVENTION

In accordance with one aspect of the invention a seismic wave source for use at marine locations is provided by means of a support structure, an expansible elastomer member supported by and disposed on at least a portion of the supporting structure to define an expansible chamber therewith, and means for discharging gases to the atmosphere. There is also provided means including an elongated conduit extending into the structure for introducing explosive material into the chamber along with means for detonating the explosive material so as to produce a high-velocity explosion wavefront down the elongated conduit into the expansible chamber. In accordance with another aspect of the invention, there is provided a pump for removing liquid condensate from the enclosure. Preferably the pump is a venturi pump actuated by a line extending to a remote location for conducting a high-pressure liquid stream to the pump.

Objects and features of the invention not apparent from the above discussion will become evident upon consideration of the following detailed description of the invention taken in connection with the accompanying drawings.

BRIEF DESCRIPTION OF THE DRAWINGS

In the drawings:

FIG. 1 is a side view, partially in section, of a seismic energy source in accordance with the teachings of the invention.

FIG. 2 is a cross-sectional view of the venturi pump illustrated in FIG. 1.

FIG. 3 is a schematic diagram of control apparatus and gas sources for supplying an explosive gaseous mixture to the apparatus of FIG. 1.

FIG. 4 is an electrical schematic diagram of apparatus for controlling the detonation of explosive gases introduced into the apparatus of FIG. 1 and for controlling the operation of certain component parts of the apparatus of FIG. 1.

DETAILED DESCRIPTION OF THE INVENTION

Figure 5:
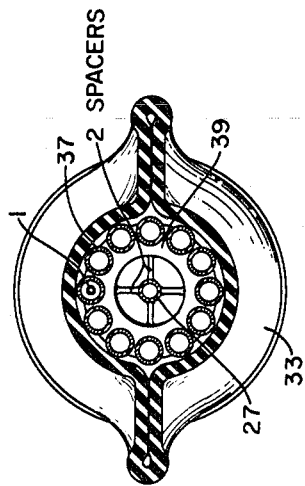
FIG. 5 is a cross-sectional view taken along section 5-5 of FIG. 1.

With reference now generally to FIGS. 1, 2, 5, and 6, there is shown a sound source for use at marine locations in accordance with the present invention. The apparatus uses an expansible, inflatable, elastomeric member 33 which preferably is in the shape of a cylindrical sleeve elastomer when there is no differential pressure thereacross. In FIGS. 1 and 5 the member is illustrated in one of the many shapes that the elastomer sleeve 33 could assume when a vacuum is drawing the elastomer sleeve member 33 inwardly, as will be described below. The elastomer sleeve member 33 is affixed to a supporting structure including end members 29 and 43 which preferably are bell-shaped and are connected together by a plurality of tubular members 37 which, as illustrated in FIG. 5, are arranged on a closed curvilinear path, preferably a circular path. The end bell members 29 and 43 extend outwardly from the tubular members 37 and away from each other. The elastomer sleeve member 33 is affixed to the bell member 29 by bands 35, and to the bell member 43 by bands 47. Disposed within the bell member 29 and substantially concentric therewith is a third bell-shaped member 31 which also is affixed to the tubular members 37. The spaces between the tubular members 37 and the bell-shaped members 29 and 31 are plugged so that water flowing between the bell-shaped members 29 and 31 will discharge only into the tubular members 37. As illustrated, the tubular members 37 are open at both ends thereof so that water can flow freely therethrough. A plurality of spacer members 30 at the ends of the bell-shaped members 29 and 31 opposite the tubular members 37 are for the purpose of maintaining the tubular members spaced apart but permitting free flow of water therethrough. The parallel tubular members 37 are illustrated as being 12 in number and, as mentioned above, as being arranged in predetermined spatial relationship, preferably parallel and in a circular pattern. The tubular members are held in such parallel spaced relationship by annular spiders 39 which are brazed or welded thereto. Each of the spiders has a central opening therein so that gases may pass freely through the chamber. The tubular members are also held in spaced relationship by closed end member 41 which also serves to confine the gases within the combustion chamber. In other words, member 41 prevents gases from escaping out the end of the assembly. The member 41 is affixed to the end bell 43. The end of the bell member 31 opposite the tubular member 37 is closed by a support plate 26 which also serves to support a combustion chamber assembly 25, and an exhaust conduit 9.

Figure 6:
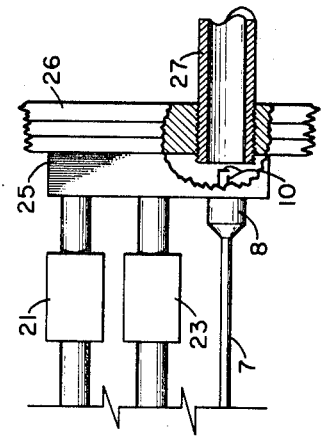
FIG. 6 is an enlarged view, partially broken away and in section, for more perspicuously illustrating the mixing chamber of the apparatus of FIG. 1.
Figure 7:
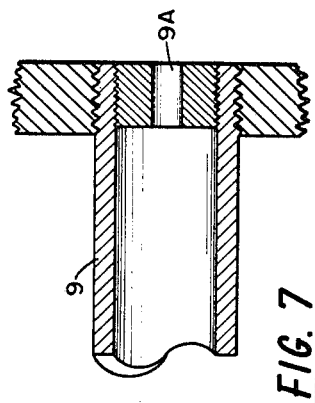
FIG. 7 is a fractional sectional view of apparatus for exhausting gases from the apparatus of FIG. 1.

Details of construction of the mixing chamber 25 are shown in FIG. 6. Lines 3 and 5, respectively, lead to a source of oxygen and to a source of a combustible gas, such as propane or acetylene, aboard a ship at a remote location. The lines are connected to the mixing chamber 25 by solenoid actuated valves 21 and 23 respectively and by pipe sections 21A and 23A respectively. Gases injected into the chamber through lines 21A and 23A are mixed therein and are passed into the chamber formed by the support structure and elastomer member, as described above, through an elongated pipe 27 which is connected through the plate 26. In the immediate vicinity of the opening of the pipe 27 into the mixing chamber, there is provided an electrically actuated combustion initiating means 8, preferably a spark plug 8 having a pair of electrodes 10 which are electrically energized from an electrical source aboard ship, as will be described below. The elongated pipe 27 extends from the plate 26 through the bell member 31 and through the space between the tubular members 37 to a point near the plate 41. As shown most perspicuously in FIG.

5, a plurality of spacer members 2 support the pipe within one of the spider rings 39. It is not absolutely necessary that the pipe 27 extend as far as shown in the drawing. The function of the pipe is primarily to produce a high-velocity combustion front that will eject into the chamber formed by the supporting structure and the elastomer member to produce a sudden, powerful detonation of the explosive gases in the chamber. The length-to-diameter ratio of the pipe should be between 75 and 300 so that the combustion front is propagated down the pipe at as high a velocity as possible and so that the energy of the seismic pulse produced by the release of the chemical energy of the explosive gas within the chamber is maximized. When the ratio is below 75, it has been found that the velocity of the front is slowed to an undesirable extent. When a ratio above 300 is used, the velocity of the combustion front does not increase appreciably.

The exhaust conduit 9 opens into the interior of bell member 31 through plate 26 and extends to the water surface for the purpose of exhausting products of combustion from the combustion chamber. A check valve (not shown) is included within the conduit 9. The check valve may be a ball check valve having a relatively heavy movable ball closure member that is normally spring-biased into engagement with a ball seat. The check valve normally prevents fluid passage into the bell member 31 from the conduit 9 and permits products of combustion to exhaust the interior of the bell-shaped member 31 only after the ball is unseated. The reason for making the ball member relatively heavy, preferably at least 3 to 5 pounds, is to provide sufficient inertia that the pressure within the combustion chamber can build up past the pressure normally required to unseat the ball member from its seat, before the check valve actually is opened. This phenomenon is described in some detail in U.S. Pat. 3,480,101.

Within the bell-shaped member 43 there is disposed a venturi pump 51 which may be affixed to the interior of the bell-shaped member 43 by suitable struts (not shown). As illustrated most perspicuously in FIG. 2, the venturi pump comprises a pipe member 1 having a nipple 57 at its end. The bore 1A of the pipe member 1 narrows to a very small diameter at its end 61. The nipple 57 is disposed within a chamber formed by member 51. A tail pipe section 59 receives high-pressure fluid from the line 1 and the nipple 61. The liquid is discharged into the chamber of the bell member 43. The housing member 51 is connected to the combustion chamber through pipe section 54, ball check valve section 52, strainer section 56, and a flexible conduit 58 which is threaded into an opening in the end bell 43 which extends through the bell to within the combustion chamber. This opening 62 opens into the combustion chamber in the natural sump formed by the elastomer member and by the end bell at the trailing end of the end bell. The line 1 for high-pressure liquid extends through one of the conduit members 37 through the space between the end bell-shaped members 29 and 31 to a pressurized liquid source (not shown) aboard ship. Pressurized liquid passing through the line 1 will be ejected through the narrow opening at the end of the nipple 57 and out the pipe section 59 into the water medium within which the sound source is disposed. Inasmuch as molecules of the fluid around the nipple 57 will be dragged out of chamber 51A by the rapidly moving liquid stream, a vacuum will tend to be produced within the chamber 51A. This will unseat the valve 52A of check valve 52 from its seat 52B so that liquid will be sucked from within the combustion chamber, through conduit 58 and strainer 53, check valve 52, and the chamber 51A and out the end of pipe member 59. The strainer 56 of member 53 may be commercially available steel wool.

Preferably a fairing is provided to protect the various conduits 1, 3, 5, 7, and 9, and the associated valving illustrated in FIG. 1 for a short distaNce from the plate 26. A suitable fairing is illustrated in the above referenced patent application of A. Barry et al.

In FIG. 3 there is illustrated suitable apparatus for controlling the injection of gases into the mixing manifold 25. As indicated above, a source 67 of oxygen or oxygen-enriched air is connected to pipe section 21A through solenoid actuated valve member 21, which may be a device such as Model V5, manufactured by Skinner Electric Valve Company, New Britain, Connecticut. Likewise, a combustible gas source 69 is connected through line 5 and a solenoid actuated valve member 23 to line 23A. It is desirable that the solenoid valves be actuated simultaneously for a very precisely controlled time so that a desired quantity of gas can be injected into the apparatus previously described with regard to FIG. 1. To this end the electrical leads 77A of solenoid of valve 21 and the leads 77B of solenoid of valve 23 are connected in parallel and to a source of electrical energy 75 which may be aboard ship through a pushbutton switch 73 and an electrical timer 71. The timer 71 may be of the type manufactured by Cramer Controls Corporation of Old Saybrook, Connecticut, Model 412. Upon closure of normally open pushbutton switch 73 the timer 71 connects the battery or energy source 75 to the lines 77A and 77B for the purpose of actuating the solenoids of the valve members 21 and 23 to open simultaneously the valves for a brief period of time, typically 1 to 3 seconds as controlled by the timer 71. It has been found satisfactory when using a source having a sleeve 33 that is about 120 cm long and 25 cm in diameter when no differential pressure thereacross, to inject therein a total of between 40000 cc to 12,000 cc of gas (measured at standard temperature and pressure).

When it is desired to produce a seismic impulse of maximum power, the timer 71 may be short-circuited and gas injected into the chamber until the check valve within conduit 9 opens.

With reference now to FIG. 4 there is illustrated an electrical schematic diagram of suitable apparatus for actuating the spark plug 8 in timed relationship with the actuation of solenoid valve 15. The secondary of an ignition coil or transformer 99 is connected to electrical terminals 101 to which electrical leads to the electrodes of the spark plug may be connected. The primary of transformer 99 is connected in series circuit relationship with a resistor 97 and capacitor 95 across the terminals of a high-voltage power source 82 which is aboard ship. A silicon controlled rectifier 85 and a diode 91 are connected in parallel with capacitor 95 and the primary of ignition transformer 99 so that, when the silicon controlled rectifier 85 is biased to conduction the capacitor 95 will discharge through the silicon controlled rectifier 85, the diode 91, and the primary of the ignition transformer 99. The control electrode 88 of the silicon controlled rectifier 85 is connected to a resistor 93 which is connected to the anode of the diode 91. A voltage source 81 is connected in parallel with the resistor 93 by means of a normally open pushbutton switch 83. Alternatively, switch 83 may be the conventional switch on a seismic recorder which controls the initiation of a seismic impulse. The value of resistor 93 is such that leakage current therethrough will normally bias the silicon controlled rectifier to substantial nonconduction. When switch 83 is closed, battery 81 will bias the silicon controlled rectifier to conduction to discharge capacitor 95 through the primary of ignition transformer 99, thus producing a spark across the terminals of the spark plug 8. Between closures of switch 83, high-voltage power source 82 will recharge the capacitor 95 through the resistor 97 and primary of ignition transformer 99.

The overall operation of the apparatus described above will now be stated. Initially timers 71 and 103 are set to provide the desired quantity of gas to enter the combustion chamber before initiation of a seismic pulse. High-pressure liquid, which may be from the water within which the source is submerged, is injected into line 1 so that a partial vacuum is induced within the interior of and then combustion proceed Switch 73 is closed to open the solenoid the combustion 21 and 23 to inject a predetermined amount of combustible mixture into the apparatus described above. The gas will enter into the mixing manifold 25 and will pass through the elongated tubular member 27 into the combustion chamber defined by bell members 29, 31, and 43, end plate 26, plate 41, and the elastomer sleeve member 33. Upon closure of switch 83 a spark will be produced across the electrodes 10 to ignite the combustible fluids within the manifold 25. A high velocity combustion front will be propagated down tube 27 and will eject into the far end of the chamber and then will proceed back through the chamber towards plate 26. When the combustion front ejects into the chamber, the combustion of the gases in the chamber is extremely rapid, so that the chemical energy therein is released over a very short time interval. As the pressure within the combustion chamber increases, the elastomer will inflate and expand to produce a seismic pulse. When the pressure in the combustion chamber is sufficient to unseat the ball member within the conduit 9, the valve will not immediately open but because of the inertia of the ball member this will permit maximum expansion of the elastomer member. When the valve within the conduit does open, the gases within the combustion chamber will quickly rush out. Meanwhile, as the apparatus is being towed through the water, the gases within the combustion chamber will be cooled to enhance the partial vacuum thus produced. Inevitably, there will be some condensation of the combustion products remaining within the combustion chamber. The venturi pump described above will produce a vacuum somewhat lower than that within the combustion chamber so that such liquid products of combustion will be sucked out of the combustion chamber and into the water around the seismic source. Should the venturi pump fail to operate or should it not produce a sufficiently low vacuum, ball 52A will seat on seat 52B to prevent water from backflowing into the combustion chamber. The steel wool in filter 53 will prevent any solid matter from preventing seating of the ball valve 52A. It has been found that the inclusion of the elongated pipe 27 in the seismic source described above produces an increase in seismic wave energy of 50 to 100 percent over the energy of the seismic waves produced without the elongated pipe 27 as a result of more complete and effective combustion of the gases over a shorter period of time. This relationship prevails until just before there has been pumped into the apparatus the absolute maximum amount of gas that the apparatus can accept prior to opening of the valve in the exhaust conduit. Thus, the inclusion of the pipe 27 makes it possible to produce seismic waves having almost the maximum amount of energy that the apparatus is capable of producing while using much less than the absolute maximum amount of gas that the apparatus can accept. The maximum amplitude of the output signals from pressure-type detectors positioned 14 feet away from the seismic source has been found to be increased as much as 250 percent by the inclusion of pipe 27 as a result of the increase in the amplitude of seismic energy, as described above.

While there has been shown and described what at present is considered to be the preferred embodiment of the present invention, other modifications will be apparent to those skilled in the art which do not depart from the scope of the broadest aspects of the invention.

I claim:

1. A seismic wave energy source for use while submerged in a liquid medium comprising:
a supporting structure, an expansible elastic member supported by and disposed upon at least a portion of the supporting structure to define an expansible chamber therewith, means for discharging gases from said structure, first means comprising an elongated conduit extending into said supporting structure for introducing explosive fluid through the conduit into said chamber, and second means for detonating the explosive fluid in said elongated conduit to produce a high-velocity explosive front therethrough and means for automatically removing liquid condensate from said expansible chamber during the operating cycle thereof.

2. The apparatus of claim 1 wherein the length-to-diameter ratio of the elongated conduit is between 75 to 1 and 300 to 1.

3. The apparatus of claim 1 wherein said first means further comprises a chamber housing for receiving said explosive fluid, said elongated conduit being arranged to provide fluid communication between the interior of said chamber housing and said expansible chamber, and wherein said second means includes a spark ignition device extending into said chamber housing for igniting explosive fluid therein.

4. The apparatus of claim 1 wherein the means for removing liquid condensate from said expansible chamber comprises means for permitting liquid passage from the chamber and preventing liquid passage into the chamber.

5. The apparatus of claim 1 wherein said supporting structure includes a plurality of elongated, parallel, spaced-apart tubular members arranged in a closed curvilinear path and bell-shaped means connected to one end of the tubular means to direct water into said tubular members and closure means connecting together the tubular members at the end thereof opposite the bell-shaped members to prevent ingress of water into the space defined by said tubular members and said inflatable member, said closure member comprising a plate between the tubular members and a bell-shaped member connected to the plate and extending outwardly from the tubular members and away from the bell-shaped member, and wherein the means for automatically removing liquid condensate includes a venturi pump within the bell-shaped member, hydraulically connected to the interior of the enclosure, and a line extending through one of said tubular members to said venturi pump for conducting a high-pressure liquid stream to said pump for actuating said pump and removing liquid from the interior of said enclosure.

6. In a seismic wave energy source for use while submerged in a liquid medium comprising a support structure having a towing end and a trailing end, an expansible elastic member supported by and disposed upon at least a portion of the supporting structure to define an expansible chamber therewith, means for introducing an explosive fluid into the chamber and means for detonating the explosive fluid, the improvement comprising pump means for removing liquid condensate from said enclosure.

7. The apparatus of claim 6 wherein said means for removing liquid condensate is a venturi pump, and wherein a line extends from said pump to a remote location for conducting a high-pressure liquid stream to said pump for actuating said pump.

8. In a seismic wave energy source for use while submerged in a liquid medium comprising a support structure having a towing end and a trailing end, an expansible elastic member supported by and disposed upon at least a portion of the supporting structure to define an expansible chamber therewith, means for introducing an explosive fluid into the chamber, and means for detonating the explosive fluid, the improvement comprising:
means for automatically removing liquid condensate from said chamber during the operating cycle of the energy source.

9. In a seismic wave energy source for use while submerged in a liquid medium comprising a support structure, an expansible elastic member supported by and disposed upon at least a portion of the supporting structure to define an expansible chamber therewith, means for introducing an explosive fluid into the chamber, and means for detonating the explosive fluid, the improvement comprising:
means for automatically removing liquid condensate from said chamber during the operating cycle of the energy source.